(12) United States Patent
Letourneau et al.

(10) Patent No.: US 8,534,892 B2
(45) Date of Patent: Sep. 17, 2013

(54) CONTROLLED FLARING LIGHT TRANSMISSION DEVICE

(75) Inventors: Fabien Letourneau, Gatineau (CA); Bevin G. Schmidt, Dunrobin (CA)

(73) Assignee: Alcatel Lucent, Paris (FR)

( * ) Notice: Subject to any disclaimer, the term of this patent is extended or adjusted under 35 U.S.C. 154(b) by 484 days.

(21) Appl. No.: 12/847,397

(22) Filed: Jul. 30, 2010

(65) Prior Publication Data

US 2012/0026750 A1    Feb. 2, 2012

(51) Int. Cl.
F21V 7/04     (2006.01)
F21V 11/00    (2006.01)
G02B 5/02     (2006.01)
H01J 5/16     (2006.01)
H01P 5/00     (2006.01)

(52) U.S. Cl.
USPC .................... 362/558; 362/559; 362/551

(58) Field of Classification Search
USPC ............... 362/555, 581, 559, 558, 551, 554; 40/547; 200/310, 313–316
See application file for complete search history.

(56) References Cited

U.S. PATENT DOCUMENTS

| 5,195,162 | A  | * | 3/1993  | Sultan et al. ................... 385/130 |
| 8,187,024 | B2 | * | 5/2012  | Williams et al. .............. 439/488 |
| 8,331,749 | B2 | * | 12/2012 | Lew ............................... 385/116 |
| 2003/0053770 | A1 | * | 3/2003  | Noddings et al. ............... 385/95 |
| 2005/0225988 | A1 | * | 10/2005 | Chaves et al. .................. 362/332 |
| 2006/0044523 | A1 | * | 3/2006  | Teijido et al. .................... 353/53 |

* cited by examiner

Primary Examiner — Mariceli Santiago
Assistant Examiner — Glenn Zimmerman
(74) Attorney, Agent, or Firm — Kramer & Amado P.C.

(57) ABSTRACT

Various exemplary embodiments relate to a light transmission device for transmitting light from at least one light source to an illuminated surface. The device may include at least one light entrance surface that allows entrance of light from the at least one light source; a light emitting surface with an area greater than the total area of the at least one light entrance surface; at least one light pipe portion extending from the at least one light entrance surface toward the illuminated surface wherein the light pipe portion internally reflects the light toward the illuminated surface; and a flared diffusion portion between the at least one light pipe portion and the light emitting surface wherein the diffusion portion internally reflects the light towards the light emitting surface. The device may be a solid piece of plastic. The light pipe portions may be curved to bend light toward the illuminated surface.

22 Claims, 4 Drawing Sheets

CONTROLLED FLARING LIGHT TRANSMISSION DEVICE

BACKGROUND

Backlit labels are often used on electronics products to make users aware of information such as the manufacturer, model number, system status, or function of a button. As the name implies, backlit labels are lit from behind, typically from within the electronics housing using a light source such as a light emitting diode (LED). Functional concerns of the electronics product usually dictate the configuration of the housing, leading to various problems lighting backlit labels.

A common method for lighting backlit labels is to place one or more LEDs directly behind the label. This use of discrete LEDs often requires additional wiring to power the LED, which may complicate design and drive up assembly costs. Discrete LEDs may also have a drawback of unevenly lighting the label, creating hotspots of light close to each LED and dark unlit portions of the label between the LEDs and near the edges, which may make the backlit label difficult to read.

Variations of discrete LEDs include LEDs with wide-angle or diffused lenses to disperse the light before reaching the label. Another variation, an LED bar, attempts to provide uniform light with an array of LEDs. While these variations help somewhat with the problem of uneven lighting, they still require additional wiring to power the LEDs and do not always fit a given case design. Diffused lenses, for example, require the LED to be placed a significant distance from the label, where it may be difficult to provide power.

Another known method is to use one or more light pipes to guide light from LEDs placed on a printed circuit board to the label. Light pipes help reduce the cost of wiring and assembly because the LEDs are incorporated in the printed circuit board. Light pipes, however, may still suffer from the problem of uneven lighting. The emitting ends of the light pipes act similarly to discrete LEDs, creating hotspots and unlit portions.

In view of the foregoing, it would be desirable to provide a lighting device to evenly backlight labels. In particular, it would be desirable to provide a label backlighting device that reduces the appearance of hotspots and unlit portions in the label. Furthermore, it would be advantageous for design and cost if the lighting device does not require additional wiring to be placed near the label.

SUMMARY

In light of the present need for a lighting device to evenly backlight labels, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a light transmission device for transmitting light from at least one light source to an illuminated surface. The device may include at least one light entrance surface that allows entrance of light from the at least one light source; a light emitting surface with an area greater than the total area of the at least one light entrance surface; at least one light pipe portion extending from the at least one light entrance surface toward the illuminated surface wherein the light pipe portion internally reflects the light toward the illuminated surface; and a flared diffusion portion between the at least one light pipe portion and the light emitting surface wherein the diffusion portion internally reflects the light towards the light emitting surface.

The light transmission device may be a solid piece of transparent plastic. Light may enter the light transmission device from a light source such as, for example a light emitting diode (LED), via one or more light entrance surfaces at one end. The light transmission device may internally reflect the light from the interface between the plastic and the surrounding air. The light pipe portion may be curved to change the general direction of the light. The critical angle of the interface may determine the maximum curvature of the light pipe portion. The light diffusion portion may be flared to control the diffusion of the light towards the illuminated surface. The flared diffusion portion may allow the light to evenly spread over a greater area while maintaining uniform intensity. The diffusion portion may flare outwardly in varying directions and degree to allow different shapes for the light emitting surface. The light emitting surface may have a greater area than the total surface area of the light entrance surfaces. In various exemplary embodiments, the area of the light emitting surface may be at least twice the total area of the light entrance surfaces. The light emitting surface may be the same shape or size as a label and provide even backlighting for the label.

The light transmission device may include a mounting portion for installing the device within an electronics housing. The mounting portion may join each of the light pipe portions and hold each light entrance surface in the correct position. The light entrance surfaces may be held near a light source, preferably directly facing an LED such that the majority of the light emitted from the LED enters the device. The mounting portion may include legs for holding the device in place. For example, the legs of the mounting portion may engage holes in a printed circuit board to retain the device. The light transmission device may also include a support element located near the diffusion portion. The support element may prevent the light emitting end from moving and leveraging excessive force on the mounting portion and circuit board.

It should be apparent that, in this manner, various exemplary embodiments provide for a light transmission device that provides even backlighting for a label or other surface. In particular, by having light pipe portions and a light diffusion portion, the light transmission device may evenly backlight labels of various shapes and sizes. Additionally, the light transmission device may be easily installed in a printed circuit board without requiring additional wiring.

BRIEF DESCRIPTION OF THE DRAWINGS

In order to better understand various exemplary embodiments, reference is made to the accompanying drawings, wherein.

DETAILED DESCRIPTION

Figure 1:
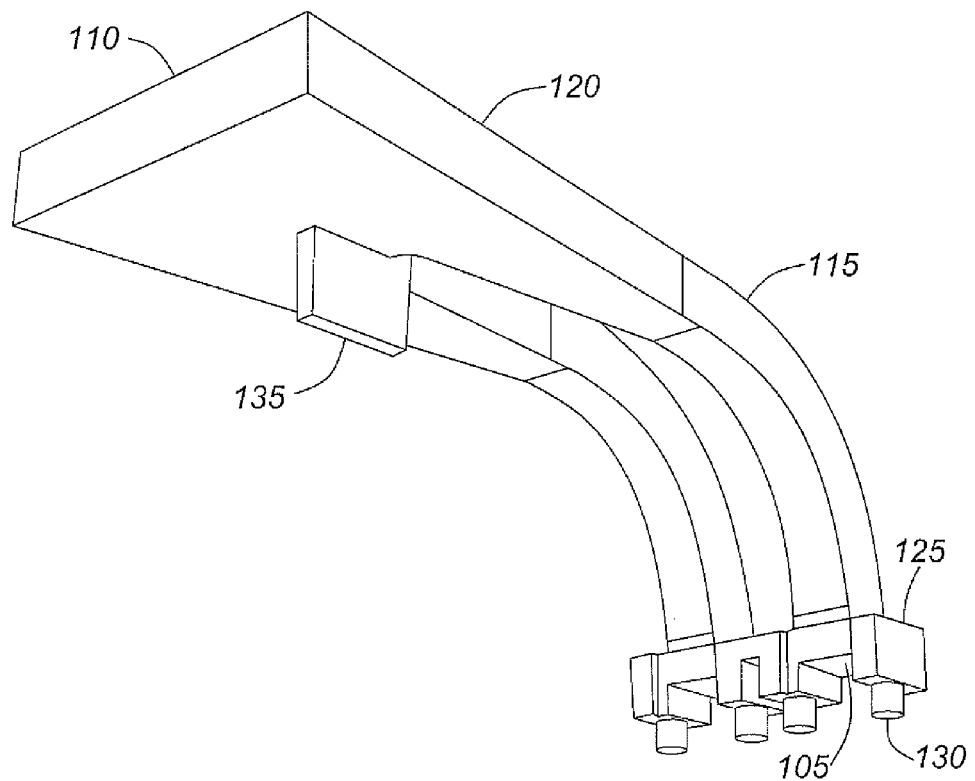
FIG. 1 illustrates a first embodiment of the light transmission device.

Referring now to the drawings, in which like numerals refer to like components or steps, there are disclosed broad aspects of various exemplary embodiments.

FIG. 1 illustrates a first embodiment of a light transmission device 100. Light transmission device 100 may act as a light guide that receives light from a light source such as, for example, an LED and emits light toward an illuminated surface. Light transmission device 100 may use the principle of total internal reflection to change the direction of the light. Light transmission device 100 may be formed of a transparent plastic such as, for example, polycarbonate plastic. The interface between the plastic and surrounding air may form a barrier that reflects all light with an angle of incidence greater than the critical angle of the interface. In various embodiments using polycarbonate plastic, the critical angle is approximately thirty-nine (39) degrees. The light emitted by light transmission device 100 may be used to evenly light an illuminated surface such as, for example, a backlit label in an electronics housing. Light transmission device 100 may include: light entrance surfaces 105, light emitting surface 110, light pipe portions 115, flared diffusion portion 120, mounting portion 125, legs 130, and support element 135.

Light entrance surfaces 105 may receive light from a light source such as, for example, an LED. A light source may be placed adjacent each light entrance surface 105 such that substantially all of the light from the light source enters light entrance surface 105. In the embodiment shown, light entrance surface 105 may be a substantially planar surface placed perpendicular to the light source. In various alternative embodiments, light entrance surface 105 may be concave such that the light entrance surface 105 is perpendicular to light emitted from the light source at various angles. Light emitted from the light source may enter light transmission device 100 at an angle less than the critical angle of the interface.

Light emitting surface 110 may emit light from within the body of the light transmission device 100. Light emitting surface 110 may be substantially perpendicular to the direction of travel within light transmission device 100, such that the angle of incidence is less than the critical angle of the interface, allowing light to exit light transmission device 100. The surface area of light emitting surface 110 may be greater than the total surface area of light entrance surfaces 105. In various exemplary embodiments, the surface area of light emitting surface 110 may be at least twice the total surface area of light entrance surfaces 105. Although shown as rectangular in the embodiment of FIG. 1, the shape of light emitting surface 110 may vary greatly as will be described in detail below. Light emitting surface 100 may be polished to allow light to exit without further diffusion. Alternatively, light emitting surface 100 may be textured to provide further diffusion to avoid hot spots on the illuminated surface.

Light pipe portions 115 may extend from light entrance surfaces 105 towards diffusion portion 120. Each light pipe portion 115 may guide light from a single corresponding light entrance surface 105. Light pipe portions 115 may be curved such that light entering light entrance surface 105 is bent approximately ninety (90) degrees by the time it reaches diffusion portion 120. Thus, light pipe portions 115 may be in the form of an arc spanning approximately ninety (90) degrees. The curvature of light pipe portions 115 may be limited to reduce the amount of light escaping through the sides of light pipe portions 115. The shape and area of a cross section of a light pipe portion 115 may remain constant along the length of light pipe portion 115. Alternatively, light pipe portion 115 may begin to flare outwardly as it approaches diffusion portion 120.

Diffusion portion 120 may extend from light pipe portions 115 towards light emitting surface 110. The sides of diffusion portion 120 may flare out in at least one direction, gradually increasing the cross sectional area of the light transmission device towards the light emitting surface 110. The flared sides of diffusion portion 120 may internally reflect light towards light emitting surface 110, while allowing the light to diffuse over a greater area. Diffusion portion 120 may join the one or more light pipe portions together as the flared sides come into contact with each other. The light paths from each light pipe portion 115 may then cross, allowing the light to evenly diffuse.

Mounting portion 125 may be formed adjacent the light entrance surface 105. Mounting portion 125 may hold light transmission device 100 in position adjacent one or more light sources. For example, mounting portion 125 may attach to a printed circuit board with surface mounted LEDs. Mounting portion 125 may position light entrance surfaces 105 above the surface mounted LEDs. Mounting portion 125 may include legs 130 that fit within holes or slots on the printed circuit board. Legs 130 may be held within the holes or slots by pressure, friction or snap tabs. In various alternative embodiments, mounting portion 125 may be the end of light pipe portion 115 that fits within a structure on the printed circuit board.

Support element 135 may be formed adjacent diffusion portion 120. Support element 135 may interact with a corresponding support element in an electronics housing to prevent light transmission device from moving. For example, support element 135 may rest on a frame member of an electronics housing. Alternatively, support element 135 may attach to a corresponding structure using any known means such as, for example, press fitting or screws.

Figure 2:
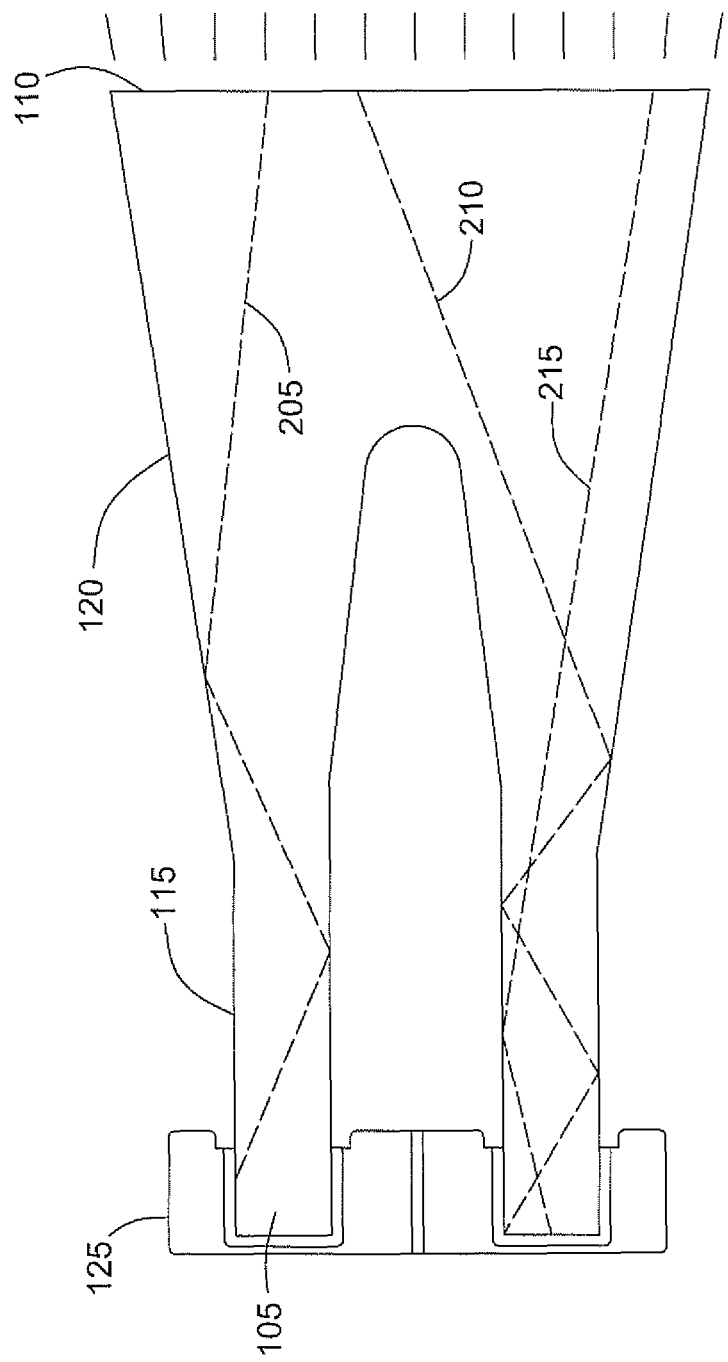
FIG. 2 illustrates a top view of the first embodiment of the light transmission device showing internal reflection of light.

FIG. 2 illustrates a top view of exemplary light transmission device 100 showing internal reflection of light. As in FIG. 1, the light transmission device 100 may include light entrance surface 105, light emitting surface 110, light pipe portion 115 and diffusion portion 120. Light paths 205, 210, and 215 illustrate possible paths light may take within light transmission device 100. It should be appreciated that these exemplary light paths are simplified for illustrative purposes. Light may traverse an infinite variety of light paths from light entrance surface 105 to light emitting surface 110.

Light path 205 shows light entering light transmission device 100 via light entrance surface 105. The light internally reflects off the interior surfaces of light pipe portion 115. Light path 205 then reflects off the interior surface of diffusion portion 120 and exits the light transmission device 100 via light emitting surface 110. Light path 210 shows light entering light transmission device 100 via light entrance surface 105 and internally reflecting off the interior surfaces of light pipe portion 115. Light path 210 then reflects off the interior surface of diffusion portion 120 and crosses the center of light transmission device 100 to exit via light emitting surface 110. Light path 215 shows light entering light transmission device 100 via light entrance surface 105 and internally reflecting off an interior surface of light pipe portion 115. Light path 215 then enters a flared region of diffusion portion 120 and exits light transmission device 110 without reflecting off an internal wall of diffusion portion 120. These sample light paths illustrate how the flared diffusion portion 120 evenly diffuses light across light emitting surface 110.

The light emitted from light emitting surface 110 may be evenly distributed without hot spots or dark unlit areas.

Figure 3:
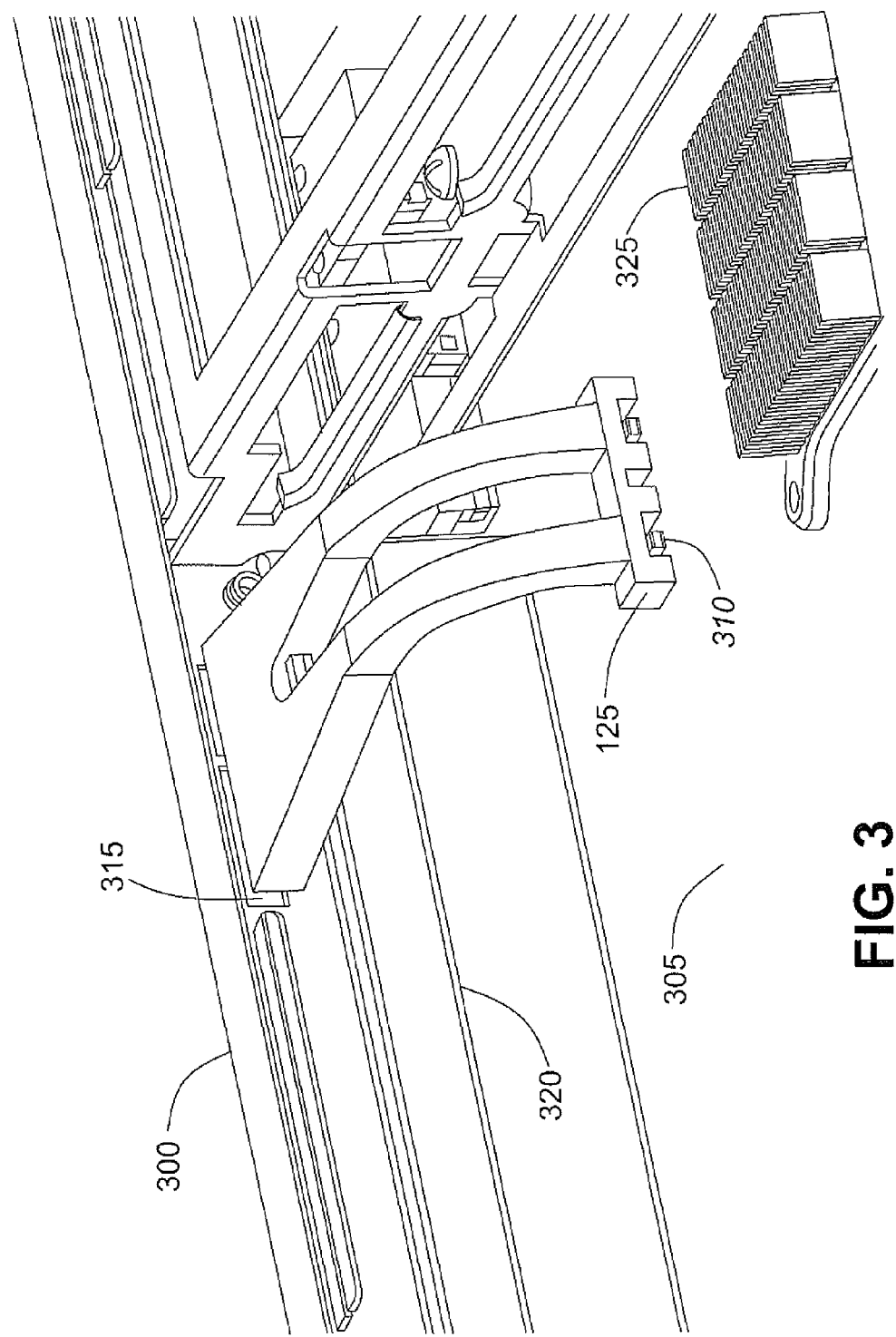
FIG. 3 illustrates the first embodiment of the light transmission device installed within an electronics housing.

FIG. 3 illustrates exemplary light transmission device 100 installed within an electronics housing 300. Electronics housing 300 may be, for example, a computer case, server rack, or any other electronics housing. Light transmission device 100 may be easily installed within electronics housing 300 by pressing legs 130 into corresponding holes or slots. Electronics housing 300 may include: printed circuit board 305, light sources 310, label window 315, frame member 320 and additional electronics components 325.

Printed circuit board 305 may be any printed circuit board such as, for example, a motherboard for a computer or server. Printed circuit board 305 may electrically connect electronics components such as, for example, light sources 310 and additional electronics components 325. Printed circuit board 310 may supply power to each electronics component via an etched pathway laminated onto a substrate. Printed circuit board 310 may include slots or other means for retaining light transmission device 100. In various alternative embodiments, light transmission device 100 may be installed into any structure for supporting and powering one or more light sources in the appropriate location. For example, an LED bar with a wired circuit may take the place of printed circuit board 305.

Light sources 310 may be any light source for illuminating a backlit label. Light source 310 may be surface mounted on and draw power from printed circuit board 305. Light source 310 may be powered whenever the electronics housing is powered or may be controlled by additional electronics components 325. When the light transmission device 100 is installed, light source 310 may be directly beneath light entrance surface 105. A light source should be chosen that emits light directly towards light entrance surface 105 so that the light is able to cross the interface between the air and plastic of light transmission device 100 without reflecting.

In various exemplary embodiments, light emitting diodes (LEDs) may be used as light sources. LEDs are available in a variety of sizes, shapes, colors and intensities. LEDs, therefore, may allow great flexibility when used with the light transmission device. LEDs emitting a narrow cone of light may be preferable because the narrow angle will allow the light to enter light transmission device 100. Other possible light sources may include incandescent bulbs, halogen bulbs, and lasers.

Label window 315 may be a window within electronics casing 300 that allows light from light transmission device 100 to backlight a label. The light emitting surface 110 may be located within 2 mm of label window 315. Light emitting surface 110 may be textured when placed in close proximity to label window 315 to further diffuse the light and reduce hotpots. The label may be an indication of the electronics manufacturer, model number, system status, or function of a button. The label may take any shape and include letters, numbers or symbols. As will be discussed in further detail below, the light emitting surface 110 may be shaped to evenly backlight almost any shape of label. The even backlighting may allow users to easily read the label and identify the product or indication. Label window 315 may be the same shape as the label. In various alternative embodiments, the label window itself may be shaped to provide the desired indication in the form of letters, numbers or symbols.

Frame member 320 may be a structural element of electronics housing 300. Frame member 320 may provide support for light transmission device 100 through contact with support element 135. Frame member 320 may be simply a flat surface on which support element 135 rests to maintain position. Alternatively, frame member 320 may provide a locking mechanism such as a screw or interlocking notch for securing support element 135 in place.

Additional electronics components 325 may include any other electronics components within electronics housing 300. For example, additional electronics components 325 may include a processor. The processor may control lighting source 310 to provide additional functionality such as blinking or intensity.

Figure 4:
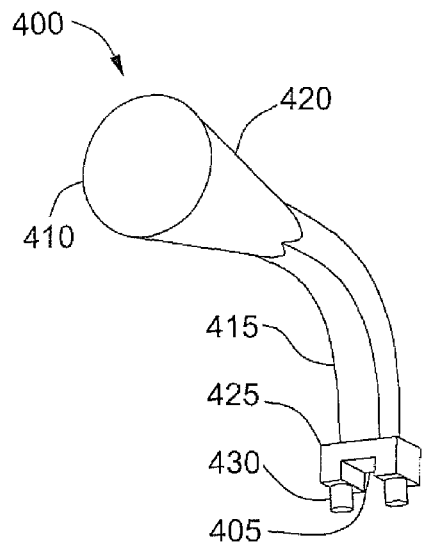
FIG. 4 illustrates a second embodiment of the light transmission device having a single light pipe portion and an elliptical light emitting surface.

FIG. 4 illustrates a second embodiment of the light transmission device 400 having a single light pipe portion 415 and an elliptical light emitting surface 410. Light transmission device 400 may be used to backlight a circular label or button. Light transmission device 400 may include: light entrance surface 405, light emitting surface 410, light pipe portion 415, diffusion portion 420, mounting portion 425 and legs 430. Light transmission device 400 may also include a support element (not shown) for stabilizing the light transmission device within an electronics housing.

Light entrance surface 405 may be similar to light entrance surfaces 105 with the exception that the light entrance surface 405 of this embodiment may be singular. Light pipe portion 415 may be similar to light pipe portions 115 with the exception that the light pipe portion 415 may be singular. Although the exemplary embodiment shown includes a light pipe 415 with a rectangular cross section, it should be apparent that the cross section of a light pipe portion 415 may be another polygon, a circle, or an ellipse. Mounting portion 425 may be formed adjacent light entrance surface 405 and hold light transmission device 405 in position near a light source. Legs 430 may fit into a printed circuit board and secure light transmission device 400.

Light emitting surface 410 may be elliptical. Although light emitting surface 410 is shown as nearly circular, variations in the shape should be apparent. For example, light emitting surface may also be a square, rectangle, pentagon or other polygon. Light diffusion portion 420 may be flared in a conical shape to control diffusion towards light emitting surface 410. As with diffusion portion 120, light may internally reflect from the interface between light diffusion portion 420 and surrounding air. Light diffusion portion 420 may provide an even distribution of light across light emitting surface 410.

Figure 5:
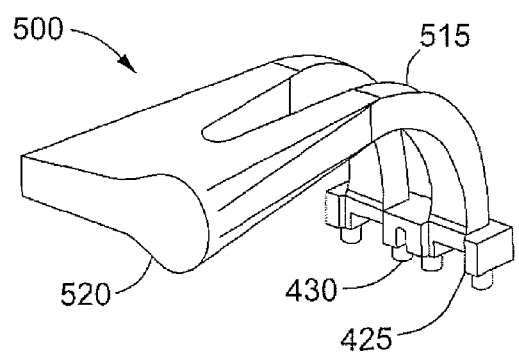
FIG. 5 illustrates a third embodiment of the light transmission device having an irregular shaped light emitting surface.

FIG. 5 illustrates a third embodiment of the light transmission device 500 having an irregular shaped light emitting surface 510. Light transmission device 500 may include a light entrance surface (not shown), light emitting surface 510, light pipe portions 515, diffusion portion 520, mounting portion 525, and legs 530. The light entrance surface, light pipe portions 515, mounting portion 525, and legs 530 may be similar to the corresponding elements discussed above with regard to FIG. 1.

Light emitting surface 510 may be irregularly shaped. In the embodiment shown in FIG. 5, the light emitting surface 510 has a rectangular region joined to a circular region. The intersection of the regions may be smoothed to prevent sharp angles. The total area of light emitting surface 510 may be greater than the total area of the light emitting surfaces. The diffusion portion 520 may initially flare out from two distinct light pipes 415 then merge as the flared sides intersect. Light from the distinct light pipes 415 may cross the center line so that some light from both pipes may light each region of light emitting surface 510. Although light emitting surface 510 and light diffusion portion 520 are shown with a particular irregular shape, it should be apparent that many other shapes are possible. The amount of flaring may be limited by the critical angle of the interface between the device material and surrounding air.

Figure 6:
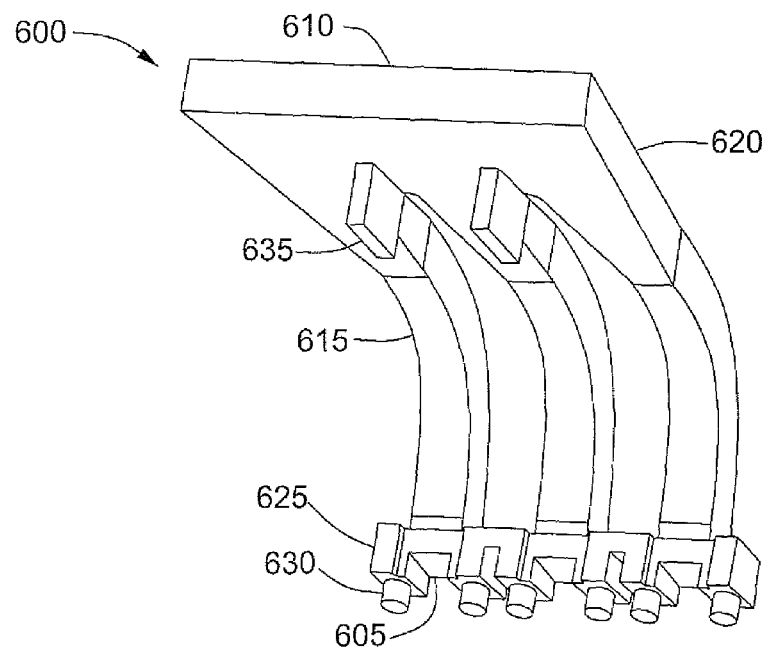
FIG. 6 illustrates a fourth embodiment of the light transmission device having three light pipe portions.

FIG. 6 illustrates a fourth embodiment of the light transmission device 600 having three light pipe portions 615. Light transmission device 600 may be useful for backlighting elongated labels such as, for example, the name of the manufacturer or model. Light transmission device 600 may include: light entrance surfaces 605, light emitting surface 610, light pipe portions 615, diffusion portion 620, mounting portion 625, legs 630, and support elements 635.

The embodiment shown in FIG. 6 has three light entrance surfaces 605 arranged in a line. Light transmission device 600 may be placed in a printed circuit board with a corresponding arrangement of light sources such that each light entrance surface 605 is placed adjacent a light source. Although light entrance surfaces 605 are shown in a line, different arrangements are possible for various circuit boards and labels. For example, the light entrance surfaces 605 may be arranged in a triangular pattern. Various embodiments may include any number of light entrance surfaces arranged to fit a given circuit board and provide the desired amount of light. Mounting bracket 625 and legs 630 may be formed adjacent light entrance surfaces 625 and hold the light transmission device 600 in position on a circuit board.

A light pipe portion 615 may extend from each of light entrance surfaces 605. Light pipe portions 615 may curve towards light emitting surface 610. In various alternative embodiments, light pipe portions 615 may not curve. For example, the light sources may be located directly opposite the label; therefore, straight light pipe portions 615 may be desirable. The light pipe portions 615 of light transmission device 600 may be substantially parallel. In various alternative embodiments, light pipe portions 615 may be non-parallel. A non-parallel arrangement of light pipe portions 615 may allow greater variation in the shape of light emitting surface 610 given a constraint on the arrangement of light entrance surfaces 605.

Light emitting surface 610 may be in the shape of an elongated rectangle. Diffusion portion 620 may join the three light pipe portions 635 and guide the light to light emitting surface 610. Diffusion portion 620 may include a flared segment formed at the end of each light pipe portion. The flared segments may merge into a singular segment as the flared sides intersect. Light from each light pipe portion 615 may cross paths with light from the adjacent light pipe. A small amount of light from an exterior light pipe may reflect to reach the far end of light emitting surface 610. Reflection of light within diffusion portion 620 may evenly diffuse light so that light emitting surface 610 emits a consistent intensity of light from one end to the other.

Support elements 635 may provide additional support for light transmission device 600. Support elements 635 may contact a structural member of an electronics housing to support diffusion portion 620 and maintain the proper location of light emitting surface 610. Support elements 635 may include locking features such as, for example, holes and/or tabs to hold support elements 635 to a structural member of an electronics housing.

The various light transmission devices described above may be made from transparent plastic. In various preferred embodiments, the light transmission device may be made from transparent polycarbonate plastic. Other suitable materials may include acrylic, butyrate, PETG, and other plastics. In various embodiments, a second material may be used to coat the transparent material and increase the internal reflection. In such embodiments, the light entrance surface 105 and light emitting surface 110 should not be coated. The light transmission device may be formed using injection molding or other methods known in the art of plastics.

According to the foregoing, various exemplary embodiments provide for a light transmission device that provides even backlighting for a label or other surface. In particular, by having light pipe portions and a light diffusion portion, the light transmission device may evenly backlight labels of various shapes and sizes. Additionally, the light transmission device may be easily installed in a printed circuit board without requiring additional wiring.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A light transmission device for transmitting light from at least one light source to an illuminated surface, the light transmission device comprising:
   at least one light entrance surface that allows entrance of light from the at least one light source;
   a flat light emitting surface with an area greater than the total area of the at least one light entrance surface;
   at least one light pipe portion having cross-sections with constant area extending from the at least one light entrance surface toward the illuminated surface wherein the light pipe portion internally reflects the light toward the illuminated surface; and
   a flared diffusion portion between the at least one light pipe portion and the light emitting surface wherein the flared diffusion portion internally reflects the light towards the light emitting surface,
   wherein the light entrance surface is approximately perpendicular to the light emitting surface and the at least one light pipe portion is curved.

2. The light transmission device of claim 1, wherein the at least one light pipe portion comprises at least two light pipe portions, and the flared diffusion portion joins the light pipe portions such that the light emitting surface emits light from both of the light pipe portions.

3. The light transmission device of claim 2, wherein light from the at least two light pipes mixes at least to some degree before being emitted from the light emitting surface.

4. The light transmission device of claim 1, wherein the area of the light emitting surface is at least twice the total area of the at least one light entrance surface.

5. The light transmission device of claim 1, further comprising a mounting portion formed adjacent the at least one light entrance surface, the mounting portion comprising a plurality of legs that hold the light transmission device near the at least one light source.

6. The light transmission device of claim 1, wherein the at least one light pipe portion and the flared diffusion portion are formed from a single piece of molded polycarbonate plastic.

7. The light transmission device of claim 1, further comprising a support element formed adjacent the flared diffusion portion.

8. The light transmission device of claim 1, wherein the light emitting surface is a rectangle.

9. The light transmission device of claim 1, wherein the light emitting surface is polished.

10. A label backlighting device for an electronics housing with at least one light source mounted on a circuit board, the backlighting device comprising:
- a transparent or translucent label in an exterior surface of the electronics housing;
- a circuit board comprising a light source;
- at least one light pipe portion, each light pipe portion having a light entrance surface that allows light from the at least one light source to enter the light pipe, the light pipe internally reflecting light toward the label; and
- a flared diffusion portion that receives light from the at least one light pipe portion and internally reflects the light towards a light emitting surface, the light emitting surface having a surface area corresponding to the surface area of the label to be backlit.

11. The label backlighting device of claim 10, wherein the label is substantially perpendicular to the at least one light source and the at least one light pipe portion is an arc spanning approximately 90 degrees.

12. The label backlighting device of claim 10, wherein the at least one light pipe portion comprises at least two light pipe portions, and the flared diffusion portion joins the light pipe portions such that the light emitting surface emits light from all of the light pipe portions.

13. The label backlighting device of claim 12, wherein light from the at least two light pipes mixes at least to some degree before being emitted from the light emitting surface.

14. The label backlighting device of claim 10, further comprising a mounting portion formed near the light entrance surface of the light pipe, the mounting portion comprising a plurality of legs that hold the light transmission device to the circuit board.

15. The label backlighting device of claim 10, wherein the at least one light source is at least one light emitting diode (LED).

16. The label backlighting device of claim 10, further comprising at least one support element formed adjacent the flared diffusion portion.

17. A light transmission device for backlighting a surface comprising:
- two tubular light pipe portions, each light pipe portion having an ingress end, a flared end, and a light entrance surface formed at the ingress end that allows entrance of light from a light source, the light pipe internally reflecting the light toward the flared end; and
- a flared diffusion portion that joins the flared ends of the light pipe portions and internally reflects the light toward a light emitting surface with an area greater than the total area of the light entrance surfaces.

18. The light transmission device of claim 17, wherein the light entrance surfaces are approximately perpendicular to the light emitting surface and the light pipe portions are curved.

19. The light transmission device of claim 17, wherein the two light pipe portions and the flared diffusion portion are formed from a single piece of molded polycarbonate plastic.

20. The light transmission device of claim 17, wherein the light emitting surface is a rectangle.

21. The light transmission device of claim 17, wherein the light emitting surface is polished.

22. The light transmission device of claim 17, wherein a cross section of each light pipe portion is rectangular.

\* \* \* \* \*